(12) United States Patent
Mills et al.

(10) Patent No.: US 8,370,930 B2
(45) Date of Patent: Feb. 5, 2013

(54) DETECTING SPAM FROM METAFEATURES OF AN EMAIL MESSAGE

(75) Inventors: Chad Mills, Redmond, WA (US); Ryan Colvin, Bothell, WA (US); Kevin Chan, Duvall, WA (US); Robert McCann, Fall City, WA (US); Aleksander Kolcz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 12/039,727

(22) Filed: Feb. 28, 2008

(65) Prior Publication Data

US 2009/0222917 A1    Sep. 3, 2009

(51) Int. Cl.
*G06F 11/00* (2006.01)
(52) U.S. Cl. .............................. 726/22; 726/30; 713/189
(58) Field of Classification Search .............. 726/22–25; 713/187, 188
See application file for complete search history.

(56) References Cited

U.S. PATENT DOCUMENTS

| 7,089,241 | B1 | 8/2006 | Alspector et al. | |
|---|---|---|---|---|
| 7,225,466 | B2 | 5/2007 | Judge | |
| 7,389,413 | B2 * | 6/2008 | Bandini et al. | 713/153 |
| 7,657,935 | B2 * | 2/2010 | Stolfo et al. | 726/22 |
| 7,716,297 | B1 * | 5/2010 | Wittel et al. | 709/206 |
| 7,818,425 | B2 * | 10/2010 | Malik | 709/225 |
| 7,860,885 | B2 * | 12/2010 | Chow et al. | 707/769 |
| 2005/0193073 | A1 | 9/2005 | Mehr et al. | |
| 2005/0216564 | A1 * | 9/2005 | Myers et al. | 709/206 |
| 2005/0262210 | A1 | 11/2005 | Yu | |
| 2006/0015561 | A1 | 1/2006 | Murphy et al. | |
| 2006/0031306 | A1 | 2/2006 | Haverkos | |
| 2006/0149821 | A1 | 7/2006 | Rajan et al. | |
| 2006/0168024 | A1 | 7/2006 | Mehr et al. | |
| 2007/0038705 | A1 | 2/2007 | Chickering et al. | |
| 2007/0118904 | A1 | 5/2007 | Goodman et al. | |

OTHER PUBLICATIONS

Jindal, et al., "Review Spam Detection", Department of Computer Science, University of Illinois, Chicago, WWW 2007 / Poster Paper, pp. 1189-1190.
Boyd, "Topic 3: Language Identification and Spam Detection", Date: Winter 2006, pp. 1-12.
Ntoulas, et al., "Detecting Spam Web Pages through Content Analysis",WWW 2006, May 23-26, 2006, Edinburgh, Scotland, pp. 1-10.
"Spam Sleuth Enterprise User's Guide", Blue Squirrel, Date: Jan. 2004, pp. 1-65.

* cited by examiner

*Primary Examiner* — Kambiz Zand
*Assistant Examiner* — Amare F Tabor
(74) *Attorney, Agent, or Firm* — Microsoft Corporation

(57) ABSTRACT

Detecting spam from metafeatures of an email message. As a part of detecting spam, the email message is accessed and a distribution of numerical values is accorded to a set of features of the email message. It is determined whether the distribution of numerical values accorded the set of features of the email message is consistent with that of spam. Access is provided to the determination of whether the email message has a distribution of numerical values accorded the set of features that is consistent with that of spam.

20 Claims, 6 Drawing Sheets

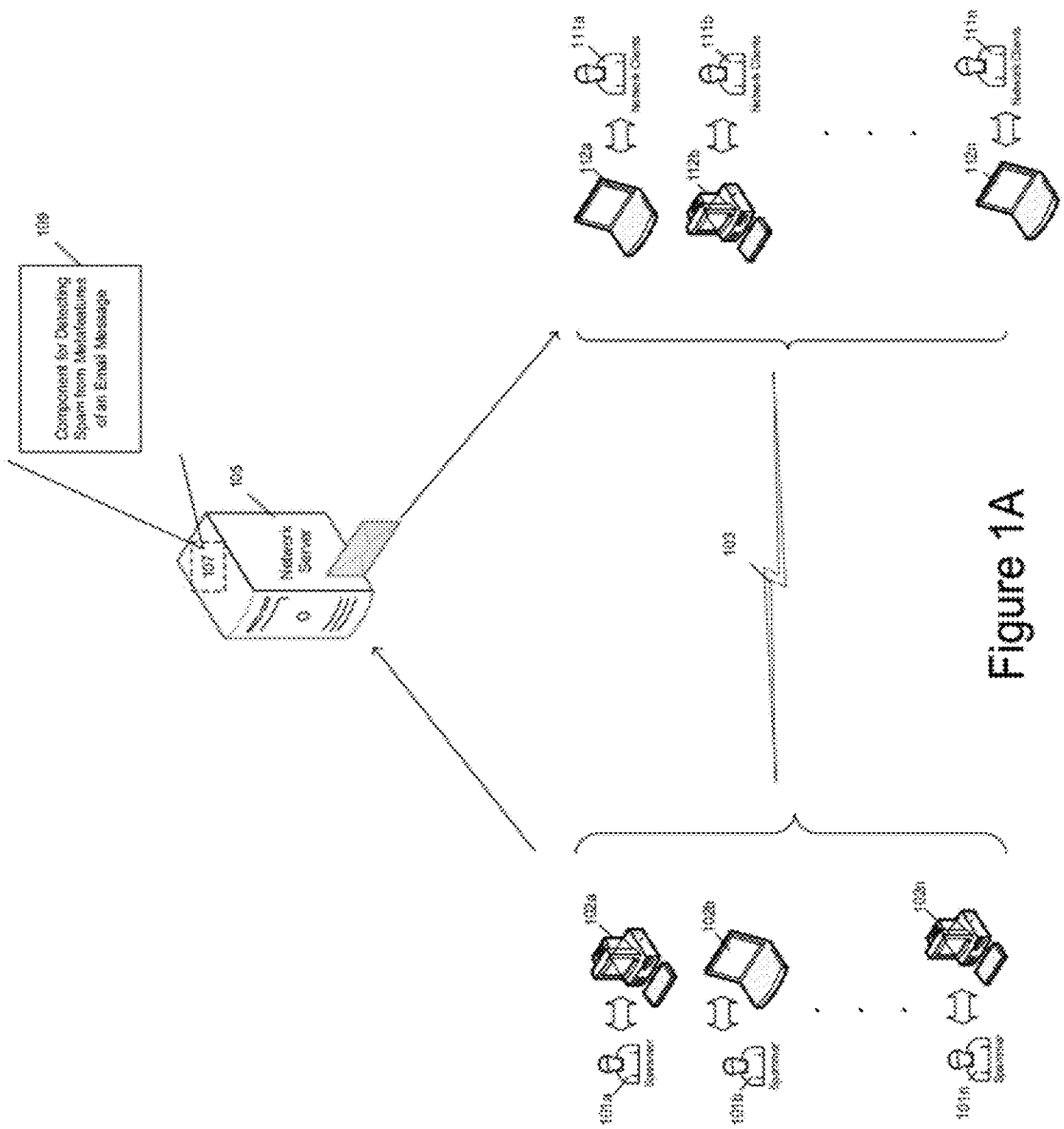

DETECTING SPAM FROM METAFEATURES OF AN EMAIL MESSAGE

BACKGROUND

Email filtering involves the processing of email messages according to predetermined criteria. Most often email filtering refers to the automatic processing of incoming messages, but can also involve human intervention as well as the intervention of artificial intelligence. Email filtering software accesses email messages as inputs and as an output can either cause an email message to pass through the filtering process unchanged for delivery to a user's email message mailbox, redirect the email message for delivery elsewhere, or even throw the email message away.

Spammers send unsolicited bulk email or unsolicited commercial email that is referred to as "spam". Spam can refer to the unsolicited bulk or commercial email itself or to its content. Spammers attempt to devise email messages that contain spam that can penetrate email filters and be delivered to targeted email users. Spammers use various techniques in order to fashion spam laden email messages that can penetrate an email filter. One approach taken by spammers involves running test messages through spam filters in order to determine the words and other email attributes that the spam filters consider to be legitimate. By adding sufficient numbers of words and attributes that are considered to be legitimate to an email message that contains spam, an email filter can be led to classify the email message as legitimate and to allow it to pass through to the email message mailbox of targeted users.

It should be appreciated that legitimate messages typically have many words that are slightly good, some that are slightly spammy, and only a small number of words that are extremely good or extremely spammy. Spammers attempting to work around an email filter attempt to deliver very spammy content to targeted users in email messages where such content is offset by a substantial amount of highly legitimate content that is included in the email messages. The spammy content and the highly legitimate content when aggregated results in the email filter giving the email message a good score.

It is interesting to note that some of the spammers that attempt to work around spam filters add such a large number of determined legitimate words that their messages get better scores than the best legitimate messages. Moreover, conventional filters are incapable of detecting such illegitimate messages and actually regard them as the best messages. Because of this, spammers can work around content based spam filters by finding gaps such as these in what the spam filter is able to detect and exploiting them (e.g., by adding a bunch of gibberish sentences full of legitimate words to an email message to make spam filters think the email message is legitimate). Accordingly, conventional spam filters are ineffective at identifying spam laden email messages that are devised by sophisticated spammers to frustrate conventional spam filters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional spam filters are ineffective at identifying spam laden email messages that includes content known to be recognized by a spam filter as legitimate and that are devised by sophisticated spammers to frustrate conventional spam filters. Embodiments use multidimensional analysis to detect such spam laden email messages that can thwart spam filters that rely principally on content analysis. As a part of the spam detecting methodology, an email message is accessed, a sum of numerical values is accorded to a first set of features of the email message that is accessed and a distribution of numerical values is accorded to a second set of features (e.g., metafeatures) of the email message that is accessed. It is determined whether the distribution of numerical values accorded the second set of features (e.g., metafeatures) of the email message is consistent with that of spam. A spam filter is provided access to the determination of whether the email message has a distribution of numerical values of metafeatures (e.g., a distribution profile) that is consistent with that of spam. The spam filter can make a decision to forward the email message to its addressee or to discard the email message based on the determination of whether the email message has a distribution profile consistent with that of spam.

BRIEF DESCRIPTION OF THE DRAWINGS

The accompanying drawings, which are incorporated in and form a part of this specification, illustrate embodiments and, together with the description, serve to explain the principles of the embodiments:

FIG. 1A shows an exemplary operational setting of a component for detecting spam from metafeatures of an email message according to one embodiment.

Figure 1B:
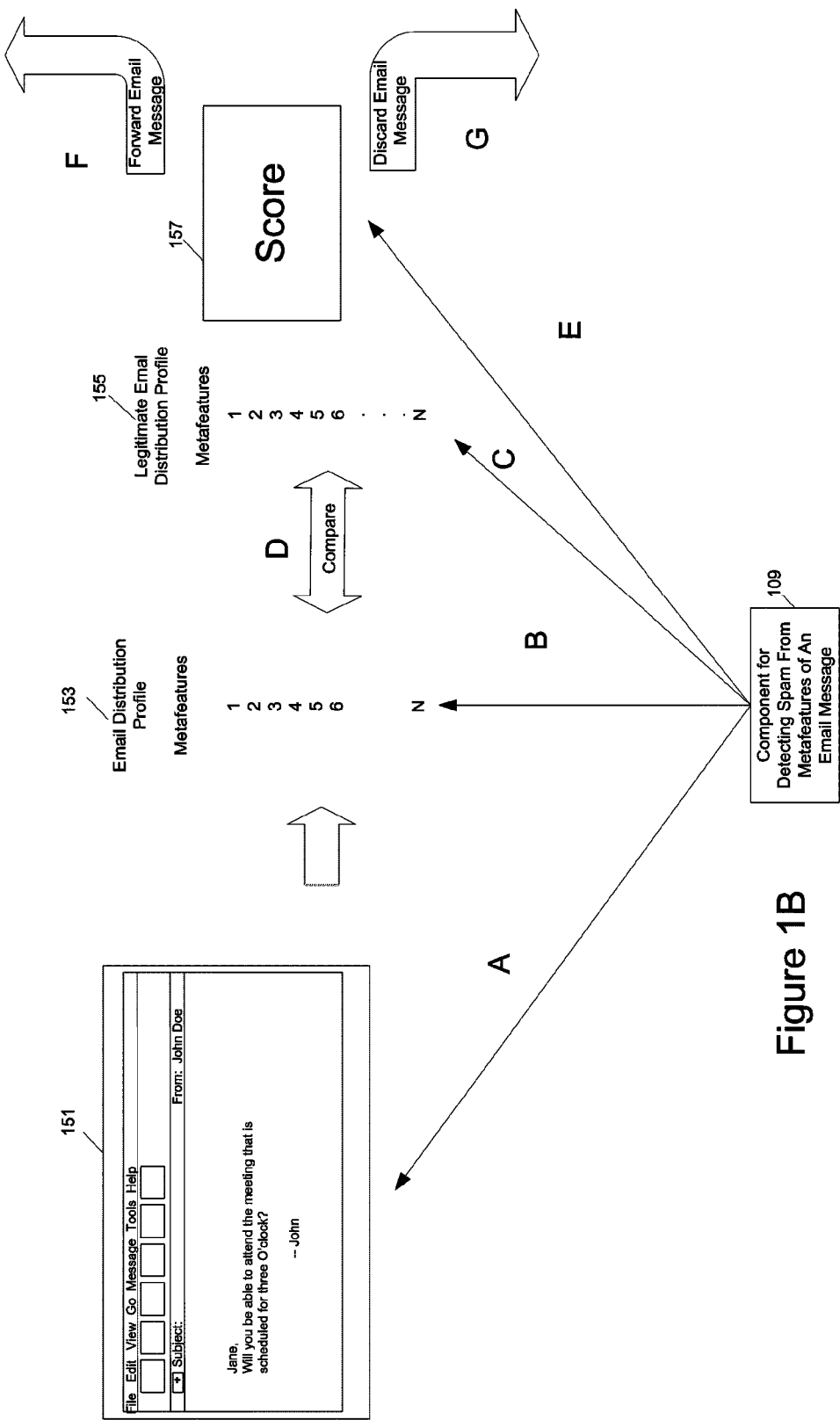
FIG. 1B illustrates operations A-G performed in process for detecting spam from metafeatures of an email message according to one embodiment.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Nomenclature

As used herein the term "spam" is intended to refer to email messages and/or email message content that is undesirable to be forwarded to its adressee. As used herein the term "spammy" is intended to refer to email message features that have been identified as tending to appear in "spam" or "illegitimate" email messages. As used herein an email message is considered to be "legitimate" if it is sufficiently non-spammy to be forwarded to its addressee. As used herein an email message is considered to be "illegitimate" or "spam" if it is sufficiently spammy to be prevented from being forwarded to its addressee. It should be appreciated that legitimate email messages can contain some spammy content and illegitimate email messages can contain some non-spammy content.

As used herein the term "metafeatures" is intended to refer to email message features to which values are assigned that are the basis upon which a message feature value distribution is determined that is used to predict whether an email message is legitimate or not based on past email messages. As used herein the term "base level features" is intended to refer to base level email message features to which values are assigned that can be used as the basis for message feature analysis such as, the summing of message feature values, the determining of the weighted average of values, IDF (inverse document frequency) term weighting, etc., that may or may not be employed as a metafeature value.

Exemplary Network Setting of a Component for Detecting Spam from Metafeatures of an Email Message According to Embodiments FIG. 1A shows an exemplary operational setting of a component 107 for detecting spam from metafeatures of an email message according to one embodiment. In one embodiment, system 107 uses multidimensional analysis of email messages via metafeatures to detect spam that can thwart filters that rely principally on content analysis. In one embodiment, system 107 evaluates parts of an email message based on predetermined metafeatures which are analyzed to determine if a message has a profile of metafeature weights that is consistent with legitimate email messages. FIG. 1A shows spammers 101a-101n, network link 103, network server 105, spam filter 107, system 109 and network clients 111a-111n.

Referring to FIG. 1A, spammers 101a-101n attempt to send spam to network clients 111a-111n via network link 103. In one embodiment, network link 103 can be a public or a private network. In one embodiment, spammers 101a-101n send email messages that include "work arounds" intended to thwart spam filter 107. In one embodiment, "work arounds" can include email messages that include spam but also include words that have been determined by the spammers to be non-spammy. In this manner an email message that includes spam can be configured to achieve "spamminess" scores from filter 107 that incorrectly indicate that the email message is legitimate (e.g., not spam). Also shown are computer systems 102a-102n associated with spammers 101a-101n.

Network server 105 services network clients 111a-111n. In one embodiment, network server 105 provides email services to network clients 111a-111n. In one embodiment, spam filter 107 is an application program that executes on network server 105. In one embodiment, spam filter 107 accesses incoming email messages and determines whether email messages are to be forwarded onward to intended network clients 111a-111n or discarded. In one embodiment, spam filter 107 can be installed either as a part of a network email program or separately for each network client 111a-111n.

Component 109 evaluates parts of an email message based on predetermined metafeatures which are analyzed to determine if a message contains spam. In one embodiment, component can be a part of spam filter 107. In another embodiment, component can be separate from spam filter 107 but operate cooperatively therewith.

In one embodiment, as a part of the operations executed to determine if an email message contains spam, component 109 determines a sum of numerical values accorded to a first set of features (base level features) of the email message and a distribution of numerical values accorded to a second set of features or "metafeatures" of the email message. Subsequently, component 109 determines whether the distribution of numerical values accorded the metafeatures of the email message is consistent with spam. Component 109 can then provide its determination to spam filter 107. If component 109 determines that the distribution of numerical values accorded the metafeatures of the email message is consistent with spam then the email message can be discarded. If it is determined that the distribution of numerical values accorded the metafeatures of the email message is not consistent with spam, then the email message can be forwarded onward to the end user to which it is addressed.

It should be appreciated that an analysis of metafeatures as discussed above, takes into account not just whether words in a message tend to be legitimate or spammy, but also the distribution of those legitimate and spammy parts. This allows spam filter 107 to detect messages that would appear legitimate to conventional spam filters but do not have a distribution profile similar to legitimate messages. In this manner, by taking all of the individual metafeatures of the email message into consideration, the filter is able to identify a message as being either legitimate or illegitimate (e.g., spam). Metafeatures are discussed herein below in detail.

Network clients 111a-111n receive incoming emails that are provided via network link 103. In one embodiment, incoming emails that are intended for network clients 111a-111n are filtered by spam filter 107. Moreover, in one embodiment, network clients 111a-111n are protected by component 109 from incoming spam laden emails that may include "work arounds" which construct the emails to avoid detection by spam filter 107. Computer systems 112a-112n associated with network clients 111a-111n are also shown in FIG. 1A.

In one embodiment, as discussed above metafeatures can be generated from an evaluation of message parts by spam filter 107 in order to obtain a distribution of values traditionally summed to arrive at a final "spamminess" score. In one embodiment, these metafeatures can be used to detect when spam filter 107 is being worked around and to enable the filtering out of more spam. Additionally, in one embodiment, component 109 can use of such meta-information in conjunction with sender reputation information to determine if an email message is spam.

Operation

FIG. 1B illustrates operations A-G performed in process for detecting spam from metafeatures of an email message according to one embodiment. These operations including the order in which they are presented are only exemplary. In other embodiments, other operations in other orders can be included.

At A, an email message 151 is accessed by component 109. As a part of the analysis that is performed by system 109, metafeatures 1-N for the accessed email message are determined, a sum of weights of base level features is determined, and a distribution profile 153 of metafeatures 1-N (distribution of determined metafeature values or weights) is determined at B. At C the distribution profiles of legitimate email messages 155 are accessed. At D, the distribution profile of the accessed email message is compared to a predetermined distribution profile of legitimate messages. At E, based on the aforementioned comparison, the email message is given a score which is compared to a predetermined threshold. At F, if the distribution profile of the email message is consistent with the predetermined distribution profile of legitimate messages (the score is above the predetermined threshold) then the email message is considered to be legitimate and may be forwarded to the addressee's mailbox. In contrast, at G, if the distribution profile of the email message is inconsistent with the predetermined profile of legitimate messages (the score is below the predetermined threshold) then the email message is considered to contain spam and may be discarded.

Data Training

Figure 1C:
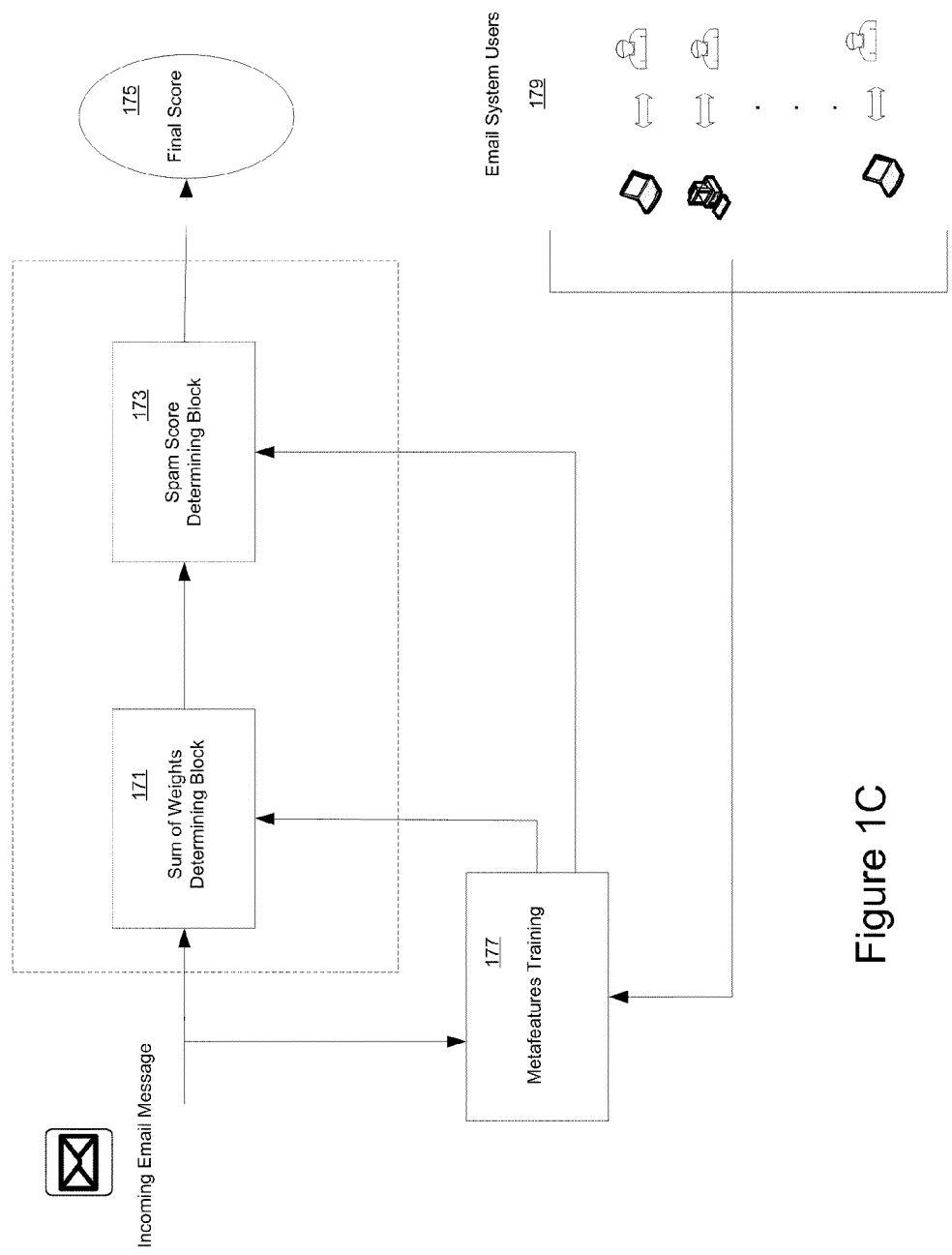
FIG. 1C is a functional block diagram that illustrates the operation of training components in the herein described methodology for detecting spam from metafeatures of an email message according to one embodiment.

FIG. 1C is a functional block diagram that illustrates the operation of data training components in the herein described methodology for detecting spam from metafeatures of an email message according to one embodiment. FIG. 1C shows sum of weights determining block 171, spam score determining block 173, spam score 175, training block 177 and email system users 179. It should be appreciated that sum of weights determining block 171 and spam score determining block 173 correspond to subcomponents 203, 205 and 207 respectively of component 109 described herein in detail with reference to FIG. 2.

Referring to FIG. 1C, an email message is input to sum of weight determining block 171 wherein a sum of weights of base level features of the email message is determined. The sum of weights is output from the sum of weight determining block 171 and input to spam score determining block 173. In one embodiment, the sum of weights can be one of the metafeatures that is analyzed at spam score determining block 173 where a distribution profile of the email message is determined and compared with a distribution profile of known legitimate email messages. Based on the result of the comparison, a spam score 175 is determined and used to determine whether the email should be forwarded on to the email user to which it is addressed or discarded. In one embodiment, metafeatures are features which may identify message feature value distribution properties (standard deviation of weights, etc.). In one embodiment, as discussed above, base level features, or other features like reputation information, can also be included as metafeatures. These features can be trained on and combined except the base level features instead of being combined into a score that is used to determine the spamminess of the email message (as is done in conventional spam filter systems) are translated into metafeatures. In one embodiment, these metafeatures can be trained on and used to contribute to the generation of, as an output, a set of metafeatures values. In one embodiment, the set of values can be combined such as by "summing," averaging, etc., to obtain a spam score or can be analyzed in any other way useful to determine whether the associated email message is consistent with spam.

In one embodiment, low spam score values can indicate that a feature tends to appear in legitimate messages while high spam score values can indicate that that a feature tends to appear in illegitimate (e.g., spam) messages. In other embodiments, other schemes for numerically indicating whether a message is legitimate or illegitimate (e.g., spam) can be used.

Training block 177 accesses email messages that are received by an email system and reviews identified email metafeatures to determine which metafeatures of an email message are spammy and which are non-spammy. In one embodiment, email system users 179 can provide information to training block 177 about the spamminess or non-spamminess of features of received email messages. In one embodiment, training block can provide information to the sum of weight block 171 and the spam score determining block 173. The information provided by training block 177 is used by the sum of weight block 171 and spam score determining block 173 to determine the sum of the weight and to determine a spam score 175 respectively.

Metafeatures

In one embodiment, email features or metafeatures (e.g., words from the body of the message, the subject, the "from" address, the sending IP address, etc.) are identified by component 109 in FIG. 1A for analysis purposes. After an identification of email features has been performed, machine learning can be used to assign numerical weights to features that indicate whether or not a feature tends to appear in either legitimate or spam messages. In one embodiment, an assigned low value can indicate that a feature tends to appear in legitimate messages and an assigned high value can indicate that a feature tends to be appear in spam messages.

As discussed herein, conventional spam filters simply look at whether or not features identified in a message tend to have been found in legitimate or spam messages in the past. Spammers can figure out what features a filter associates with legitimate messages, and by adding enough features that a filter associates with legitimate messages to their spam message the spam filter has little or no chance of detecting it. Legitimate messages, though, do not tend to have many features that are extremely spammy or extremely good. Moreover, for legitimate messages while the average feature tends to be good the values tend to be smaller than the values found in work arounds.

In one embodiment, the use of metafeatures by component 109 in FIG. 1A in its analysis of email messages defeats the above discussed tactic and helps to identify messages that contain spam by ascertaining that the distribution of weights of the metafeatures upon which the analysis is made does not match the distribution profile of a legitimate message. This approach makes it difficult for spammers to penetrate spam filter 107 in FIG. 1A with email messages that contain spam by offsetting the spam with good content.

In exemplary embodiments, the final score accorded to an email message, such as by component 109 in FIG. 1A, is not simply based on a sum of weights as provided by conventional filtering systems but also takes into account the distribution of weights discussed above, which makes it much more difficult to work around the anti-adversarial action of a spam filter, such as spam filter 107 in FIG. 1A. In one embodiment, the operation of component 109 in FIG. 1A effectively counters the increasing sophistication of spammers who design their messages to penetrate spam filters using techniques such as are described herein.

In one embodiment, the step performed by conventional spam filters that involves adding up feature weights to obtain a final score is augmented. In one embodiment, component 109 in FIG. 1A receives as input a set of (feature, weight) pairs and outputs a final score. Accordingly, in exemplary embodiments, metafeatures are a second level of features which take into account the original features and their weights.

In one embodiment, examples of metafeatures include but are not limited to the metafeatures that are listed in Table 1 below:

TABLE 1

METAFEATURES

Sum of weights (the final score in conventional systems)
Standard deviation of weights
Average feature weight
Number of features
Message length (e.g. measured in bytes, words, etc.)

TABLE 1-continued

METAFEATURES

Percentage of features with strong legitimate weights
Percentage of features with strong spam weights
Percentage of features in various other weight ranges
Maximum weight
Minimum weight
Median weight
Upper quartile (the median of the weights between the median and the maximum weight)
Lower quartile (the median of the weights between the median and the minimum weight)
Groups of other metafeatures (e.g. a Boolean feature Indicating that the message has its sum of weights is between X and Y and an upper quartile between M and N.
Other Indicators of spamminess not present in the content litter, like reputation data
Normal content features already used in the base level machine learning In addition, in one embodiment some features that are used in conventional systems for content training can be used for metafeatures training. The analysis of metafeatures is effective at detecting spam from spammers who attempt to work around the filter (such as by detecting statistical patterns related to how the filter views messages that do not match those of legitimate emails). Moreover, some features previously used in content filtering, such as the IP address of the email or the SenderID authentication cannot be worked around as easily as can normal content features. By eliminating these and using them as a part of the metafeatures analysis, noise is removed from statistical calculations which only pertain to features that can be worked around while machine learning continues to use these features to determine whether or not they indicate a message is legitimate or spam.

In one embodiment, these metafeatures are then run through a machine learning algorithm to determine a corresponding set of weights which are summed to obtain a final score. It should be appreciated that in one embodiment, metafeatures can be used any time a filter's evaluation of parts of a message are combined to form a score. In one embodiment, this can entail the addition of a single layer to a spam filter. However, in other embodiments other configurations can be employed. In one embodiment, the analysis of metafeatures does not have to be applied to an entire email message. In one embodiment, the email message can be separated into parts and an analysis of metafeatures can be run on each part, with an additional layer of metafeature analysis used to detect whether or not the different parts of the message are structured in a manner that looks suspicious.

For example, in one embodiment, if an analysis of the metafeatures finds that the uppermost portion of the email message is very spammy while the other parts of the message are legitimate, using the additional layer of metafeature analysis, component 109 in FIG. 1A can identify this distribution as a suspicious distribution of metafeature weights. In contrast, conventional filters operating without such a step are likely to consider this type of email message to be legitimate (based on low average feature weight and a normal standard deviation that such messages usually register).

Exemplary embodiments result in a substantial reduction of spam in users' Inboxes. Moreover, exemplary embodiments operate effectively against spammers attempting to work around the email filter. In one embodiment, much of the remaining spam that may be forwarded may come from newsletters and other gray mail that some users want and others don't.

Exemplary embodiments define a set of metafeatures which model abstract properties of email messages. By adding these metefeatures to the parameters analyzed by spam filters, spammers find it much more difficult to work around the spam filters, e.g., if they exploit a hole too heavily the spammers will expose themselves on the metalevel because of the metafeature analysis performed by exemplary embodiments.

Figure 2:
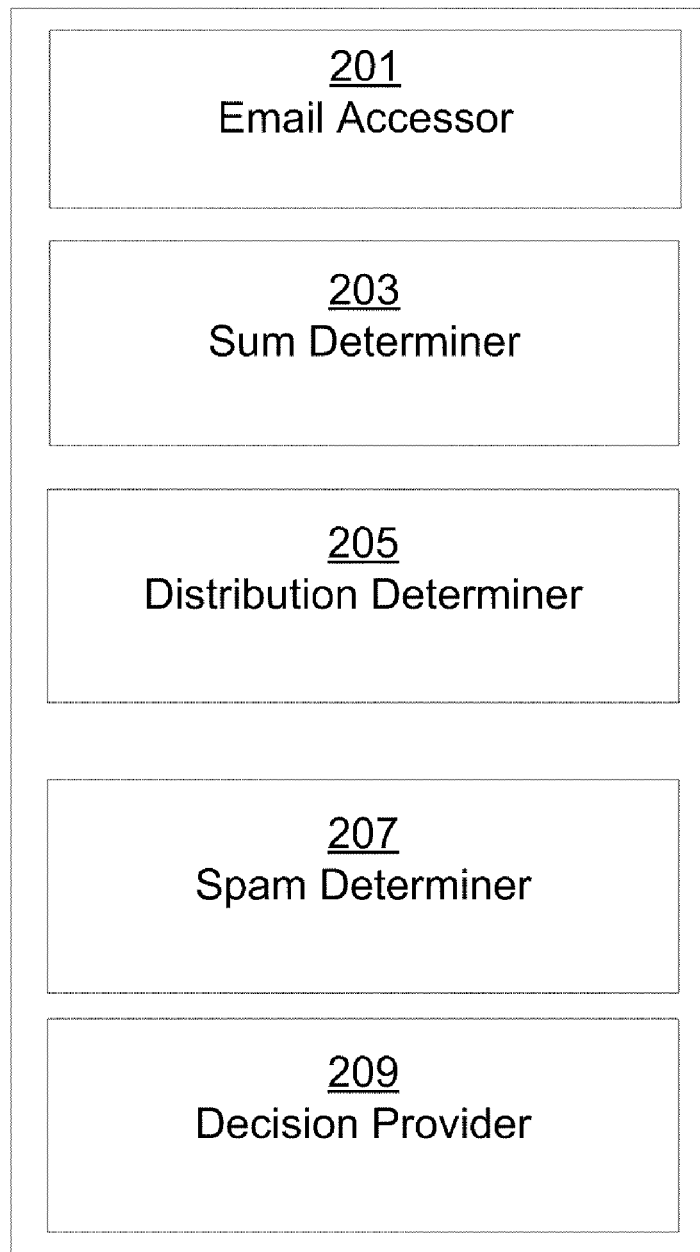
FIG. 2 shows a component for detecting spam from metafeatures of an email message according to one embodiment.

Subcomponents of Component for Detecting Spam from Metafeatures of an Email Message According to Embodiments FIG. 2 shows subcomponents of component 109 (shown in FIG. 1A) for detecting spam from metafeatures of an email message according to one embodiment. In one embodiment, component 109 implements an algorithm for detecting spam from metafeatures of an email message. In the FIG. 2 embodiment, system 109 includes accessor 201, sum determiner 203, distribution determiner 205, spam determiner 207, and decision provider 209.

It should be appreciated that aforementioned subcomponents of component 109 can be implemented in hardware or software or in a combination of both. In one embodiment, subcomponents and operations of component 109 can be encompassed by components and operations of one or more computer programs (e.g., spam filter 107 in FIG. 1A). In another embodiment, subcomponents and operations of system 109 can be separate from the aforementioned one or more computer programs but can operate cooperatively with components and operations thereof.

Referring to FIG. 2, email message accessor 201 accesses email messages that are received by the email system that is associated with component 109. In one embodiment, the email messages that are accessed are to be analyzed by component 109 for spam content.

Sum determiner 203 determines a sum of numerical values that have been assigned to a first set of features (base level features) of the email messages accessed by email accessor 201. In one embodiment the values can be assigned through operation of a spam filter (e.g., 107 in FIG. 1) associated with component 109. In another embodiment, the values can be assigned by a system that is separate from the spam filter that is associated with component 109. In one embodiment, a training component (see FIG. 1C) can provide information having to do with what is considered to be legitimate or non-spammy and illegitimate or spammy features upon which assignments of numerical values to a first set of features of an email message is based.

Distribution determiner 205 determines a distribution of numerical values assigned to a second set of features or "metafeatures" of the email messages accessed by email accessor 201. In one embodiment the values can be assigned through operation of distribution determiner. In another embodiment, the values can be assigned by an application that is separate from component distribution determiner 205 but operates cooperatively therewith. In one embodiment, a training component (see FIG. 1C) can provide information having to do with what is considered to be legitimate and illegitimate upon which assignments of numerical values to one or more of the metafeatures of an email message is based.

Spam determiner 207 determines whether the distribution of numerical values accorded the second set of features of email messages accessed by email accessor 201 is consistent with spam. In one embodiment, such a decision can be based on a comparison of the distribution profile of numerical values accorded the second set of features of the email message accessed by email accessor 201 with a predetermined distribution profile of legitimate messages.

In one embodiment, as discussed with reference to FIG. 2, if the distribution profile of the email message is consistent with the predetermined profile of legitimate messages then the email message is considered to be legitimate and may be forwarded to the addressee's mailbox. In contrast, if the distribution profile of the email message is inconsistent with the predetermined profile of legitimate messages then the email message is considered to contain spam and may be discarded.

Decision provider 209 provides access to the decision made by spam determiner 207 (whether email is or is not considered to contain spam). In one embodiment, access to the decision can be provided to a spam filter associated with component 109.

Figure 3:
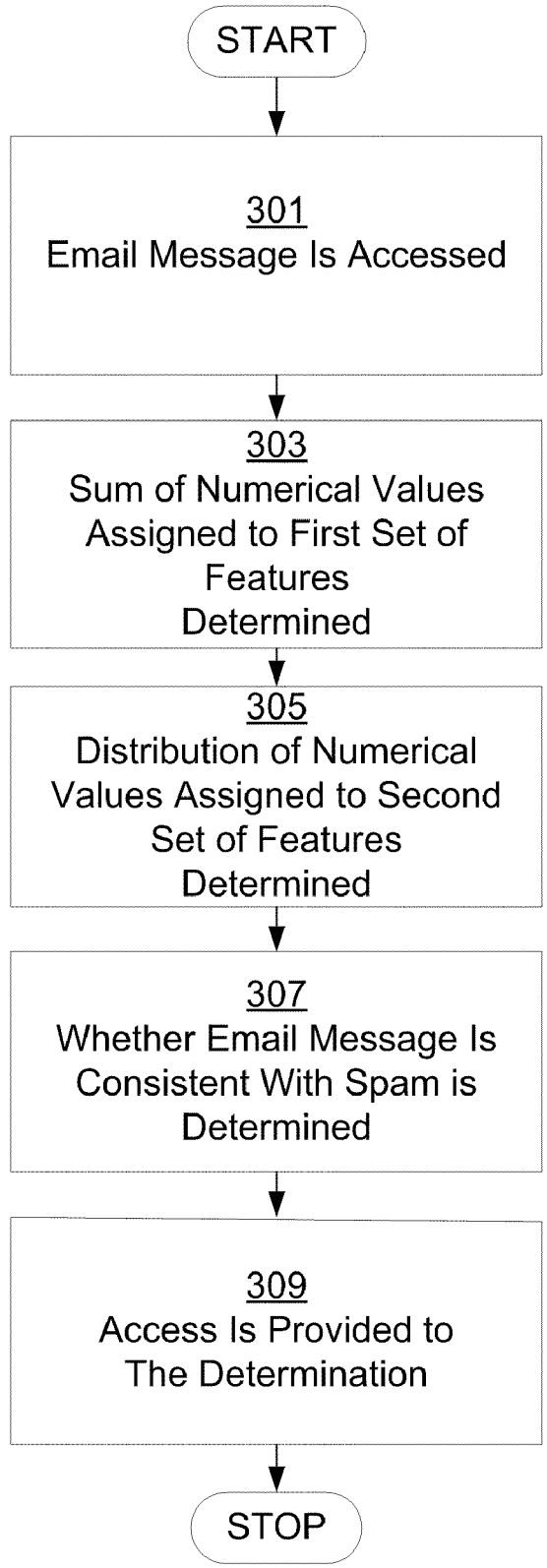
FIG. 3 shows a flowchart of the steps performed in a method for detecting spam from metafeatures of an email message according to one embodiment.

Exemplary Operations of Method for Detecting Spam from Metafeatures of an Email Message According to Embodiments FIG. 3 shows a flowchart 300 of the steps performed in a method for detecting spam from metafeatures of an email message according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at step 301 email messages are accessed. In one embodiment, the email messages that are accessed are to be analyzed by a spam filter (including component 109 in FIG. 1A) for spam content.

At step 303, a sum of numerical values that have been assigned to a first set of features of the email messages is accessed. In one embodiment the values can be assigned through operation of a spam filter (e.g., 107 in FIG. 1A). In another embodiment, the values can be assigned by a system that is separate from the spam filter.

At step 305, a distribution of numerical values that are assigned to metafeatures of the email messages is accessed. In one embodiment the values can be assigned through operation of a system associated with the spam filter such as component 109 of FIG. 1A. In another embodiment, the values can be assigned by a system that is separate from a system such as component 109 but operates cooperatively therewith.

At step 307, it is determined whether the distribution profile of numerical values accorded metafeatures of the accessed email messages is consistent with the distribution profile of spam. In one embodiment, such a decision can be based on a comparison of the distribution profile of numerical values accorded the second set of features of the email message accessed such as by email accessor 201 of FIG. 2, with a predetermined distribution profile of legitimate messages.

At step 309, access is provided to the determination made regarding the consistency of the distribution profile of the email message with that of spam. In one embodiment, access to the determination can be provided to a spam filter. Moreover, the spam filter can base a decision to discard or forward the email message on the determination.

Figure 4:
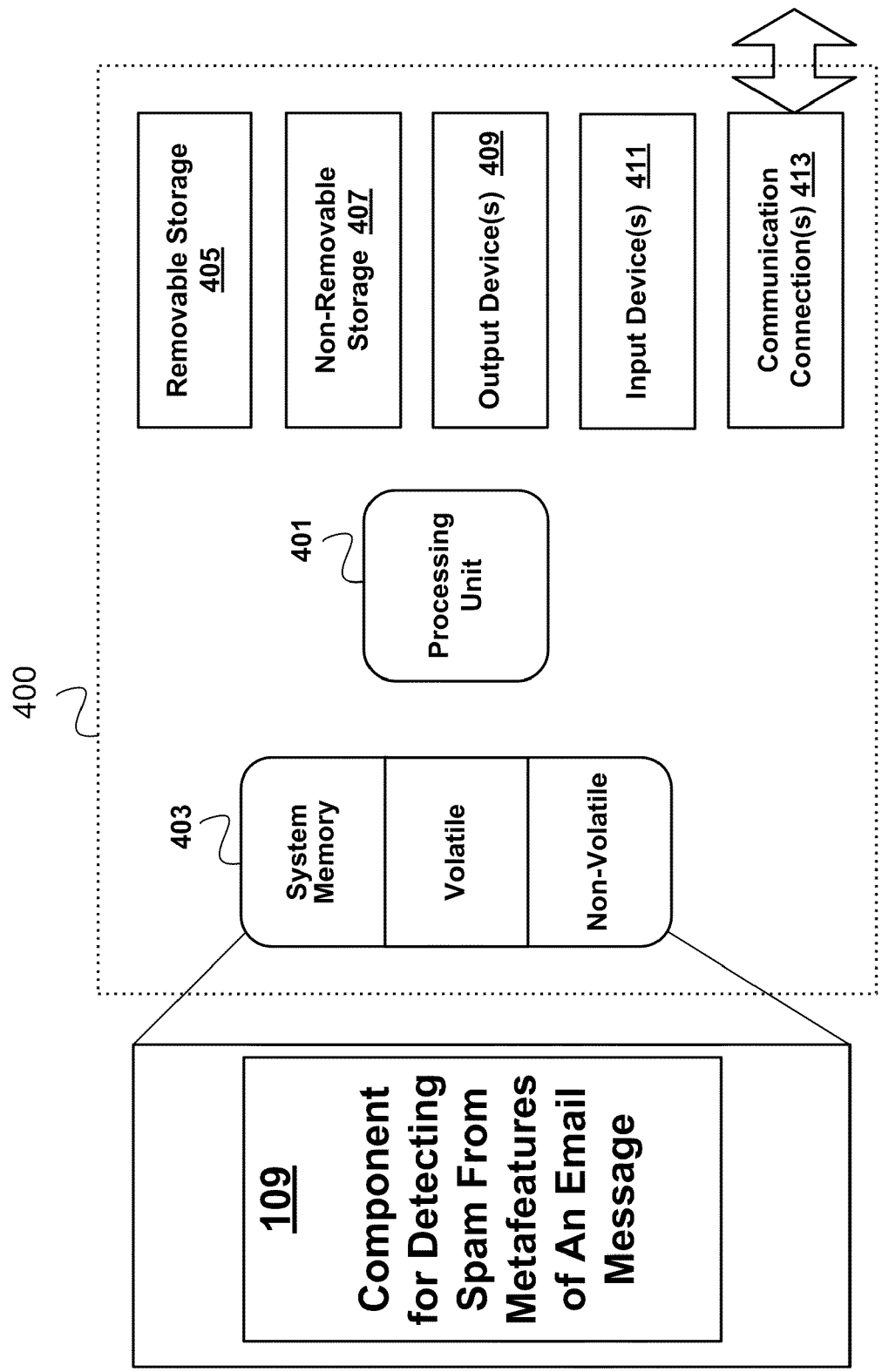
FIG. 4 shows an exemplary computing device according to one embodiment.

FIG. 4 shows an exemplary computing device 400 according to one embodiment. Referring to FIG. 4, computing device 400 can be included as a part of a server (e.g., network server 105 in FIG. 1A) and/or an interface device (e.g., computer systems 102a-102n and 112a-112n in FIG. 1A) in accordance with one embodiment. Computing device 400 typically includes at least some form of computer readable media. Computer readable media can be any available media that can be accessed by computing device 400 and can include but is not limited to computer storage media.

In its most basic configuration, computing device 400 typically includes processing unit 401 and memory 403. Depending on the exact configuration and type of computing device 400 that is used, memory 403 can be volatile (such as RAM), non-volatile (such as ROM, flash memory, etc.) or some combination of the two.

Additionally, computing device 400, especially the version that can be a part of network server 105 in FIG. 1A, can include mass storage systems (removable 405 and/or non-removable 407) such as magnetic or optical disks or tape. Similarly, computing device 400 can include input devices 409 and/or output devices 411 (e.g., such as a display). Additionally, computing device 400 can include network connections 413 to other devices, computers, networks, servers, etc. using either wired or wireless media. As all of these devices are well known in the art, they need not be discussed in detail.

With reference to exemplary embodiments thereof, detecting spam from metafeatures of an email message is disclosed. As a part of detecting spam, the email message is accessed, a sum of numerical values is accorded to a first set of features of the email message and a distribution of numerical values is accorded to a second set of features of the email message. It is determined whether the distribution of numerical values accorded the second set of features of the email message is consistent with that of spam. A spam filter is provided access to the determination of whether the email message has a distribution of numerical values of the second set of features that is consistent with that of spam.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for filtering an email comprising:
    analyzing one or more non-image portions of the email to calculate a distribution profile for the email, at least some of the distribution profile based upon a first location of a first non-image portion of the email and a second location of a second non-image portion of the email, the first non-image portion associated with a first feature, the second non-image portion associated with a second feature; and
    determining whether to filter the email based at least in part on the distribution profile, at least some of at least one of the analyzing or the determining implemented at least in part via a processing unit.

2. The method of claim 1, at least one of the first feature or the second feature comprising one or more numerical values based at least in part on multidimensional analysis.

3. The method of claim 2, comprising summing at least some of the one or more numerical values.

4. The method of claim 2, a lower numerical value indicative of a higher likelihood of a legitimate email and a higher numerical value indicative of a higher likelihood of a spam email.

5. The method of claim 2, comprising evaluating at least one of the first feature or the second feature based at least in part on a weighted average of at least some of the one or more numerical values.

6. The method of claim 1, comprising determining whether to filter the email based at least in part on a sender reputation of a sender of the email.

7. The method of claim 1, comprising determining whether to filter the email based at least in part on one or more comparisons between the distribution profile and one or more historical distribution profiles.

8. The method of claim 1, at least one of the first feature or the second feature comprising at least one of zero or more base level features or zero or more meta-features.

9. The method of claim 8, at least one of the zero or more meta-features comprising at least one of a sum, a standard deviation, an average, a percentage, an upper quartile, or a lower quartile weight.

10. The method of claim 1, at least one of the first non-image portion or the second non-image portion comprising at least one of a recipient, a sender, a subject, a body, or a signature line.

11. A system for filtering an email comprising:
a distribution component configured to analyze one or more non-image portions of the email and calculate a distribution profile for the email, at least some of the distribution profile based upon a first location of a first non-image portion of the email and a second location of a second non-image portion of the email, the first non-image portion associated with a first feature, the second non-image portion associated with a second feature indicative of a location; and
a filtering component configured to determine whether to filter the email based at least in part on the distribution profile.

12. The system of claim 11, comprising an access component configured to retrieve the email.

13. The system of claim 11, comprising a training component configured to provide distribution data for comparison.

14. The system of claim 11, comprising a score component configured to calculate one or more weights corresponding to at least one of the first feature or the second feature based at least in part on at least one of a sum or an average.

15. The system of claim 11, at least one of the first non-image portion or the second non-image portion comprising at least one of a recipient, a sender, a subject, a body, or a signature line.

16. The system of claim 11, at least one of the first feature or the second feature comprising at least one of zero or more base level features or zero or more meta-features.

17. A computer-readable storage device comprising computer-executable instructions, which when executed at least in part via a processing unit on a computer perform acts, comprising:
analyzing one or more non-image portions of an email to calculate a distribution profile for the email, at least some of the distribution profile based upon a first location of a first non-image portion of the email and a second location of a second non-image portion of the email, the first non-image portion associated with a first feature, the second non-image portion associated with a second feature; and
determining whether to filter the email based at least in part on the distribution profile.

18. The computer-readable storage device of claim 17, comprising determining whether to filter the email based at least in part on a sender reputation of a sender of the email.

19. The computer-readable storage device of claim 17, comprising determining whether to filter the email based at least in part on one or more comparisons between the distribution profile and one or more historical distribution profiles.

20. The computer-readable storage device of claim 17, at least one of the first feature or the second feature comprising at least one of zero or more base level features or zero or more meta-features.

* * * * *